United States Patent [19]
Lords et al.

[11] Patent Number: 4,911,343
[45] Date of Patent: Mar. 27, 1990

[54] CONTAINER CARRIER FOR A VEHICLE

[76] Inventors: Kevin J. Lords; John L. Lords, both of 4190 Sovereign Way, Salt Lake City, Utah 84124

[21] Appl. No.: 331,233

[22] Filed: Mar. 31, 1989

[51] Int. Cl.$^4$ ............................................... B60R 9/00
[52] U.S. Cl. ........................... 224/42.43; 224/42.46 R; 224/42.13
[58] Field of Search ............... 224/42.13, 42.14, 42.18, 224/42.12, 42.46 R, 42.45 R, 42.03 A, 42.07, 42.43; 248/505, 339, 305, 318, 229

[56] References Cited
U.S. PATENT DOCUMENTS

| | | | |
|---|---|---|---|
| 1,798,239 | 3/1931 | Welker et al. | 224/42.13 |
| 3,658,201 | 4/1972 | Williams et al. | 224/42.13 |
| 3,972,457 | 8/1976 | Kesler | 224/42.13 |
| 4,327,849 | 5/1982 | Sharpton | 224/42.03 A |
| 4,392,597 | 7/1983 | Traugh | 224/42.13 |

FOREIGN PATENT DOCUMENTS

| | | | |
|---|---|---|---|
| 923642 | 2/1955 | Fed. Rep. of Germany | 224/42.45 R |
| 317675 | 8/1929 | United Kingdom | 224/42.13 |

*Primary Examiner*—Linda J. Sholl
*Attorney, Agent, or Firm*—Donald J. Breh

[57] ABSTRACT

A container carrier for use with an exteriorly mounted spare tire and wheel assembly of a vehicle is disclosed. The carrier includes an X-shaped frame having a pair of U-shaped mounting receptacles on the ends of two upper leg portions of the frame for receipt around the spare tire and two resilient members connectable between each U-shaped receptacle and the spare wheel. A container holding shelf extends between two lower leg portions of the frame and a container retention assembly is provided including a retention member disposed above and extending across the shelf for engaging the container and a disconnectable tensioning strap connectable between the shelf and the retention member.

14 Claims, 1 Drawing Sheet

CONTAINER CARRIER FOR A VEHICLE

BACKGROUND OF THE INVENTION

This invention relates to an article carrier for use on a vehicle. More particularly, the invention relates to a container carrier particularly adaptable for use on a vehicle having an exteriorly mounted spare tire and wheel assembly.

Carriers and racks for carrying containers such as auxilary gasoline cans or fuel gas containers or other articles such as bicycles have been devised. Those racks and carriers adapted for holding articles such as bicycles, such as that disclosed in U.S. Pat. No. 4,392,597, are not adapted to hold a container and other carriers that are adapted for holding containers, such as those disclosed in U.S. Pat. Nos. 3,658,201 and 4,327,849, require physical attachment to the structure of the vehicle. Such physical attachment technically involves modification to the vehicle's frame and/or body structure such as by drilling holes for receiving mounting bolts and other hardware. These structures are effectively permanently affixed to the vehicle which is asthetically unpleasing, limits access to the vehicle body and is not easily performed by the typical vehicle owner or user and it is undesirable to drill holes in body and frame components which are not intended to be there. Also, these permanently installed carriers do not provide for easily changing to a different carrier adapted to hold or carry a different type of article and thus preclude the ability to carry such other articles. Also, these carriers are typically specifically designed and adapted for use only with one specific model of vehicle and are not transferable when the vehicle is replaced.

SUMMARY OF THE INVENTION

Accordingly, the invention overcomes the shortcomings of the prior art by providing for a removable carrier for securely holding a container to a vehicle.

According to the invention, the carrier is adapted for removable mounting to an exteriorly mounted spare tire and wheel assembly of a vehicle.

According to the preferred embodiment of the invention, the carrier includes an X-shaped frame having four leg portions of which two upper adjacent leg portions include U-shaped receptacles for receipt around portions of the tire.

According to an important feature of the invention, a container holder shelf extends horizontally from the X-shaped frame between two lower leg portions of the frame.

Another feature of the invention provides for a horizontally disposed retention member to extend from the frame in a vertically spaced relationship with the shelf adapted to engage the container.

Another important feature of the invention provides for a removable container retention strap to extend between the shelf and the container retention member.

A still further important feature of the invention provides for the strap extending between the shelf and the container retention member to be flexible and for the attachment of the strap to the shelf and retention member to be adapted to tension the strap.

According to the invention, the strap is attachable to the retention member with a tensioning type buckle.

A still further very important feature of the invention provides for two resilient members, one of each attached to each of the two adjacent upper leg portions at the U-shaped mounting receptacles and the opposite ends of each member adapted to removably attach to the spare wheel on the vehicle, such as in an opening in the wheel, whereby the frame is securely but removably attached and retained to the spare tire and wheel assembly.

Still additional features of the invention provide for the X-shaped frame to include two J-shaped straps joined together at a location intermediate their length where one end of each strap defines one of the U-shaped receptacle portions for receipt around the spare tire.

BRIEF DESCRIPTION OF THE DRAWINGS

The invention will be better understood after reading the following Detailed Description of the Preferred Embodiment in conjunction with the drawings in which.

DETAILED DESCRIPTION OF THE PREFERRED EMBODIMENT

Figure 1:
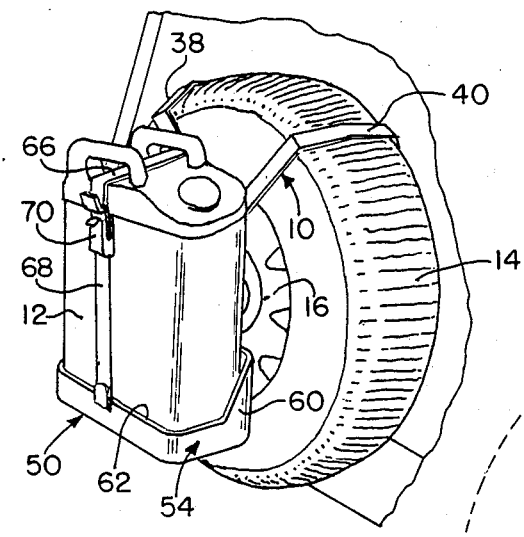
FIG. 1 is a pictorial view of the carrier according to the invention shown mounted to a vehicle.
Figure 2:
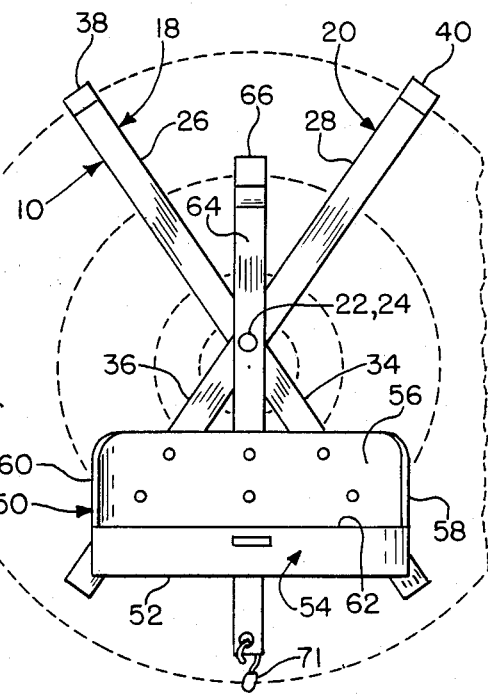
FIG. 2 is an elevational view of the carrier in FIG. 1 taken toward the carrier when mounted showing details of construction.

Shown in FIG. 1 is a carrier 10 for holding a container such as an auxiliary gasoline container 12 for transport on a vehicle. While the carrier is described and is particularly suited for holding a gasoline container, such as a typical 5 gallon gasoline can, that application is representative of only one use and the invention is not to be considered limited to holding only a gasoline container. The carrier 10 is constructed for removable mounting on a vertically, exteriorly mounted spare tire 14 and wheel 16 assembly of the vehicle which is typically used on van-type, utility or other recreational vehicles.

The carrier includes a generally X-shaped frame formed from either a one piece, preferably metallic plate or from two elongated J-shaped straps 18, 20 joined together at a location 22 intermediate their lengths such as by welding or with a fastener 24 so as to form the X-shape having two upper adjacent leg portions 26, 28 each having an inverted U-shaped free end 30, 32 respectively and two other lower adjacent leg portions 34, 36.

Figure 3:
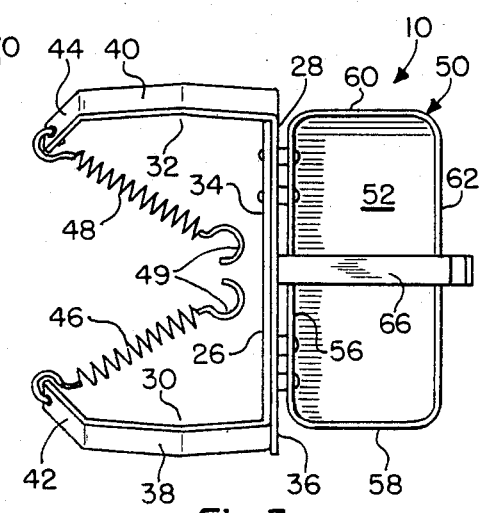
FIG. 3 is a top elevational view of the carrier according to the invention showing details of construction.

Referring to FIG. 3, each U-shaped end 30, 32 includes a transverse portion 38, 40 having a length preferably at least equal to the width of the widest tire commonly used on the vehicle and a depending portion 42, 44 outwardly downwardly disposed relative to the frame legs. The U-shaped portions 30, 32 define receptacles for receipt around angularly spaced apart portions of the tire with the frame legs 26, 28 disposed vertically down across the face of the wheel and tire.

Figure 4:
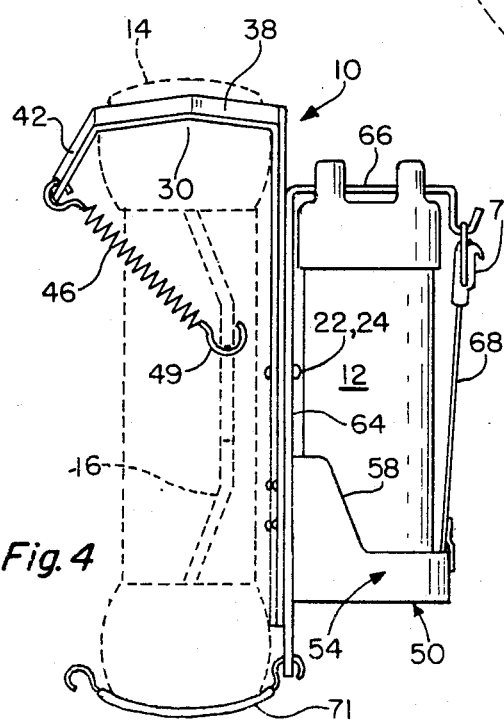
FIG. 4 is a side elevational view of the carrier showing further details of construction.

Two resilient extensible members such as a resilient strap, cord or combination strap and extention spring or turn buckle shown in FIGS. 3 and 4, are attached at one end to the free ends of the outwardly, downwardly disposed legs 42, 44 of the mounting receptacles and are each provided with a hook 49 at their opposite end for engagement in a cut out portion of the spare wheel, such as the wheels central mounting hole or other decorative spoke-like opening. The length and resiliency of the members 46, 48 is dimensioned such that the members tension and securely hold each transverse portion 38, 40 against the peripherial surface of the tire yet provide for fast, easy connection and disconnection from the wheel.

A horizontally disposed container holding shelf 50 including a plate-like platform 52 having a raised peripherial edge in the form of vertically contoured wall 54 is mounted between the two lower leg portions 34 and 36 below the junction point 22. The platform 52 is affixed to a back wall member 56 which is bolted or welded to the leg portions 34, 36.

As shown in the drawing, the opposing end portions 58, 60 of the wall 54 extend vertically and are contoured downwardly from preferably about the height of the back wall 56 to a relatively low front wall 62. The high sides 58, 60 provide for positive lateral retention of the container and the low front wall 62 provides for transverse retention and for easy removal of the container which only needs to be lifted over the relatively low front wall which is very advantageous in the case of a full container which will have considerable weight.

Further retention of the container is achieved by a retention system adapted to engage around the top and front of the container. The retention system includes a retention member in the form of an L-shaped strap having a depending leg 64 affixed to the frame, for example by way of the fastener at the location 22 or by welding, a second horizontally disposed retention leg 66 extending parallel to and at least partially across the width of the shelf and a flexible retention strap 68 affixed at one end centrally to the front wall 59 of the shelf and at its other end to the free end of the horizontal retention member leg 66 by way of a tensioning type buckle 70. If desired, a resilient member such as a resilient extensible strap or cord could be used in place of the flexible strap and tensioning buckle arrangement as another retention means. Other retention means can be devised by those skilled in the art and those described herein are representative of only preferred retention arrangements which provide for positive container retention and fast, easy attachment and removal of the container. Additional auxiliary retention means such as resilient cords or straps can be provided if desired, 71 to secure the container and or frame however, the simple one strap retention member in combination with the holder wall configuration provides for adequate container retention and the U-shaped receptacles and frame retention straps adequately retain the carrier to the spare tire and wheel assembly.

Having described the preferred embodiment of the invention, those skilled in the art having the benefit of the description and drawings can readily devise other embodiments and modifications and such other embodiments and modifications are to be considered to be within the scope of the appended claims.

What is claimed is:

1. A carrier for use with an exteriorly mounted spare wheel and tire assembly on a vehicle comprising:
   an X-shaped frame including a pair of generally U-shaped portions one at each end of two adjacent upper leg portions of the X-shaped frame, each generally U-shaped portion adapted to be received around portions of the spare tire;
   a horizontally disposed shelf mounted between two adjacent lower leg portions of said X-shaped frame; said shelf extending perpendicularly from said X-shaped frame; and
   a retention member mounted to said frame and extending generally perpendicularly from said X-shaped frame at least partially across and spaced above said shelf.

2. The carrier as defined in claim 1 further including means for removably connecting said retention member to said shelf.

3. The carrier as defined in claim 2 wherein said means for removably connecting said retention member to said shelf includes a disconnectable strap extending between said shelf and said retention member.

4. The carrier as defined in claim 1 further including a pair of resilient members, one attached to each generally U-shaped portion and each including means for removable attachment to the spare wheel.

5. The carrier as defined in claim 4 wherein each of said resilient members is attached to an end of one of said U-shaped portions and includes hook means for engaging said wheel in an opening at said wheel.

6. A carrier for use with an exteriorly mounted spare wheel and tire assembly on a vehicle comprising:
   an X-shaped frame including a pair of generally U-shaped portion one at each end of two adjacent upper leg portions of the X-shaped frame, each generally U-shaped portion adapted to be received around portions of the spare tire;
   two resilient members, one attached to each of said two adjacent upper leg portions at a location proximate a free end of said U-shaped portion and including means for removable attachment to the spare wheel; and
   a container holder attached between two adjacent lower leg portions of said X-shaped frame.

7. The carrier as defined in claim 6 wherein said container holder includes horizontally disposed shelf attached between said two adjacent lower leg portions and a retention member attached to said X-shaped frame extending at least partially across said shelf said retention member being spaced above said shelf and adapted to engage the container.

8. The carrier as defined in claim 7 further including a strap removably attached between said shelf and said retention member.

9. A carrier for use with an exteriorly mounted spare tire and wheel assembly of a vehicle comprising:
   a generally X-shaped frame including means for mounting said frame to said spare tire and wheel assembly in a substantially vertical orientation, said means for mounting including two upper leg portions of said X-shaped frame each having a generally inverted portion for receipt around the tire and two resilient members one attached to each U-shaped portion and adapted to removably attach to the wheel, said X-shaped frame further including means for holding a container including a horizontally disposed shelf extending from said X-shaped frame attached between two lower leg portions of said X-shaped frame above said shelf for engagement with said container.

10. The container as defined in claim 9 further including a strap removably connected between said shelf in a free end of said retention member.

11. The carrier as defined in claim 10 wherein said strap is flexible and the connection of said strap provides for tensioning of said strap.

12. The carrier as defined in claim 9 wherein said X-shaped frame comprises two elongated J-shaped strap-members defining said generally U-shaped mounting portions at one end of each J-shaped member, said J-shaped members joined together at locations intermediate their length into said X-shape, said shelf includes a plate-like member having a raised wall along at least a portion of its perimeter, said shelf affixed between said two J-shaped strap-like members at locations disposed to a side of said location whereat said J-shaped members are joined together opposite to the side on which said U-shaped portions are disposed and said retention member is an L-shaped strap having one leg affixed to said J-shaped members at the location whereat said two J-shaped members are joined extending vertically away from said shelf and having a second leg extending away from said J-shaped members generally parallel to said plate-like member.

13. The carrier as defined in claim 12 further including a flexible member attached to said shelf adapted to removably connect to a free end of said second leg of said retention member.

14. The carrier as defined in claim 13 wherein said flexible member is connected to said free end of said second leg of said retention member by a tensioning type buckle.

* * * * *